(12) United States Patent
Zavesky et al.

(10) Patent No.: US 10,841,238 B2
(45) Date of Patent: Nov. 17, 2020

(54) PRIORITIZED NETWORK BASED ON SERVICE AND USER DEVICE

(71) Applicant: AT&T INTELLECTUAL PROPERTY I, L.P., Atlanta, GA (US)

(72) Inventors: Eric Zavesky, Austin, TX (US); Gavin Bedell, Dallas, TX (US); Corine Brahamsha, Manalapan, NJ (US); Debbie Miksiewicz, Brick, NJ (US); Grant Hewitt, Spring, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 253 days.

(21) Appl. No.: 15/849,632

(22) Filed: Dec. 20, 2017

(65) Prior Publication Data
US 2019/0190848 A1 Jun. 20, 2019

(51) Int. Cl.
G06F 15/167 (2006.01)
H04L 12/927 (2013.01)
H04L 12/911 (2013.01)

(52) U.S. Cl.
CPC .......... H04L 47/805 (2013.01); H04L 47/821 (2013.01); H04L 47/822 (2013.01); H04L 47/823 (2013.01)

(58) Field of Classification Search
CPC combination set(s) only.
See application file for complete search history.

(56) References Cited

U.S. PATENT DOCUMENTS

| 7,324,523 | B2 | 10/2008 | Dacosta |
| 7,747,255 | B2 | 6/2010 | Dacosta et al. |
| 8,526,815 | B2 | 9/2013 | Adler et al. |
| 9,088,803 | B2 | 7/2015 | Li et al. |
| 9,143,400 | B1* | 9/2015 | Roskind .............. H04L 41/0896 |
| 9,225,772 | B2 | 12/2015 | Lui et al. |
| 9,647,760 | B2 | 5/2017 | Rollet |
| 9,813,299 | B2 | 11/2017 | Htay |

(Continued)

FOREIGN PATENT DOCUMENTS

| CN | 103841044 | 6/2014 |
| CN | 104301256 | 1/2015 |

(Continued)

Primary Examiner — Chris Parry
Assistant Examiner — Stephen J Houlihan
(74) Attorney, Agent, or Firm — Amin, Turocy & Watson, LLP

(57) ABSTRACT

Various embodiments disclosed herein provide for software defined networking system to provide network service and bandwidth prioritization in a customer's network. The user equipment devices can be connected to a gateway device on a premise network. The gateway device or a server communicably coupled to the gateway device can include an intelligence agent that can prioritize bandwidth, network services, user equipment devices based on a variety of contexts. The intelligence agent can also dynamically increase or decrease the bandwidth available to the gateway device in some embodiments. In an embodiment, the software defined networking system can also instantiate virtual network functions on either the local gateway device or the cloud server in order to provide functionality for one or more network services used by the user equipment device on site.

20 Claims, 10 Drawing Sheets

(56) References Cited

U.S. PATENT DOCUMENTS

| | | | |
|---|---|---|---|
| 9,838,296 B2 | 12/2017 | Armolavicius et al. | |
| 2005/0076037 A1* | 4/2005 | Shen | G06Q 10/107 |
| 2009/0193485 A1* | 7/2009 | Rieger | H04N 21/2402 |
| | | | 725/114 |
| 2011/0307559 A1* | 12/2011 | Son | H04L 12/1859 |
| | | | 709/206 |
| 2012/0173365 A1* | 7/2012 | Soroca | G06Q 30/02 |
| | | | 705/26.3 |
| 2013/0065601 A1* | 3/2013 | Song | H04W 28/26 |
| | | | 455/452.1 |
| 2015/0249623 A1* | 9/2015 | Phillips | H04L 65/4084 |
| | | | 709/219 |
| 2016/0234234 A1 | 8/2016 | Mcgrew et al. | |
| 2016/0315830 A1 | 10/2016 | Cote et al. | |
| 2017/0181038 A1* | 6/2017 | Yeddala | H04W 28/20 |
| 2017/0187607 A1* | 6/2017 | Shaikh | H04L 45/02 |
| 2018/0007001 A1* | 1/2018 | Sun | H04L 63/0236 |
| 2019/0068473 A1* | 2/2019 | Vu | H04W 28/0231 |

FOREIGN PATENT DOCUMENTS

| | | |
|---|---|---|
| CN | 105610617 | 5/2016 |
| CN | 105897612 | 8/2016 |
| CN | 106027421 | 10/2016 |
| WO | 2017128790 | 8/2017 |

\* cited by examiner

PRIORITIZED NETWORK BASED ON SERVICE AND USER DEVICE

TECHNICAL FIELD

The present application relates generally to the field of software defined networking and, more specifically, to prioritizing network services and bandwidth based on the network service and user device and profile information.

BACKGROUND

Existing solutions to manage networks in order to prioritize bandwidth and provide quality of service choices are limited to mobile networks and do not extend to user networks or premise networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
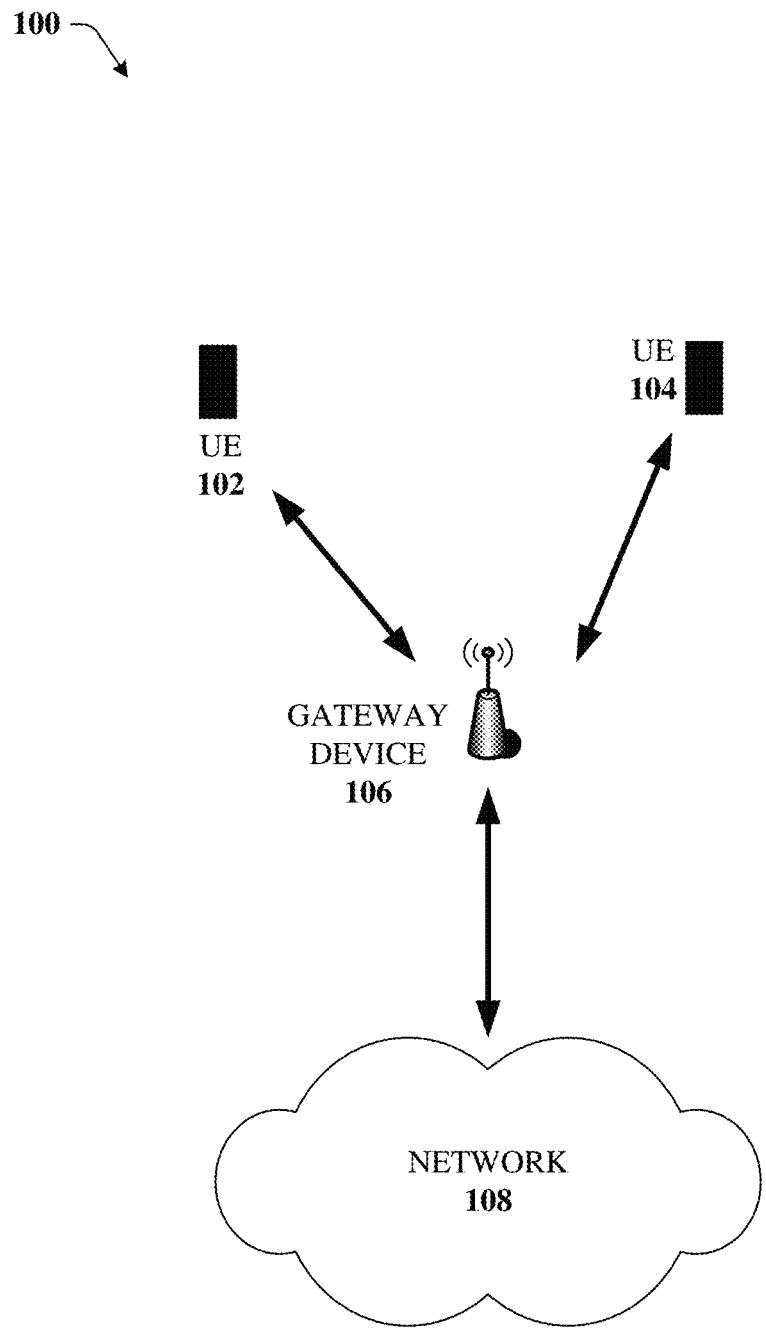
FIG. 1 illustrates an example network that provides quality of service controls and software defined networking in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for software defined networking system to provide network service and bandwidth prioritization in a customer's network. The user equipment devices can be connected to a gateway device on a premise network. The gateway device or a server communicably coupled to the gateway device can include an intelligence agent that can prioritize bandwidth, network services, user equipment devices based on a variety of contexts. The intelligence agent can also dynamically increase or decrease the bandwidth available to the gateway device in some embodiments. In an embodiment, the software defined networking system can also instantiate virtual network functions on either the local gateway device or the cloud server in order to provide functionality for one or more network services used by the user equipment device on site.

In an embodiment, a software defined networking ("SDN") network can be created to allow customization of a user or subscriber's network, allowing the customer to control where the network goes (certain devices, location in the house) and prioritize users and various devices, network services, etc. Along with SDN, the system provides the ability to create a more flexible service by allowing temporary bandwidth increases from the backhaul and to the end users. This dynamic system facilitates quality of service ("QoS") controlled by real-time events and a predictive local agent (software) that can interact with customers.

In an embodiment, the system can extend real-time manipulation to bandwidth flexibility and the capability to dynamically start virtualized network functions ("VNFs") on a customer premise (or owned by a customer promise but running in the cloud). In another embodiment, service patterns and bandwidth profiles can be created that both exist singularly and in combined bundles across device type, service type (video, gaming, etc.), user location in the premises, a specific time of day, etc. In yet another embodiment, an intelligent predictive service (agent) can be created to monitor, modify, alert, and learn the patterns of devices, patterns of services, bandwidth and VNF requirements of connected devices and services on user's premises.

In an embodiment, an improvement to existing computing devices that provide routing and bandwidth management is the ability to dynamically manage bandwidth allotted to router devices, as well as managing bandwidth and QoS based on device profiles, user profiles, and preference information as well as the ability to dynamically start VNFs on a customer's premise or in a cloud server in order to manage network services requested by one or more devices on a customer's network.

In various embodiments, a server can comprise a processor and a memory that stores executable instructions that, when executed by the processor facilitate performance of operations. The operations can comprise retrieving profile data associated with a user device connected to a gateway device, wherein the profile data comprises bandwidth priority data associated with the user device. The operations can also comprise predicting that a bandwidth requirement for a network service requested by the user device is likely to exceed an available bandwidth allotted to the gateway device. The operations can also comprise adjusting, the available bandwidth allotted to the gateway device, wherein an increase in the available bandwidth is based on the bandwidth priority data associated with the user device.

In another embodiment, the method comprises determining, by a router device comprising a processor, profile data for a user equipment connected to the router, wherein the profile data is based on a function of subscriber data associated with a subscriber identity and device preference data associated with the user equipment, and wherein the profile data comprises bandwidth priority data associated with the user equipment. The method can also comprise forecasting, by the router device, that a first bandwidth for a network service requested by the user equipment is greater than a second bandwidth that is allotted to the router device by a server device. The method can also comprise transmitting, by the router device, a request to increase the second bandwidth allotted to the router device, wherein an increase in the second bandwidth is based on the bandwidth priority data associated with the user equipment.

In another embodiment machine-readable storage medium, comprising executable instructions that, when executed by a processor of a device, facilitate performance of operations. The operations can comprise determining profile data associated with a user equipment device connected to a gateway device, wherein the profile data comprises bandwidth priority data associated with the user equipment device. The operations can also comprise determining that a bandwidth requirement for a network service requested by the user equipment device is likely to exceed an available bandwidth allotted to the gateway device. The operations can also comprise adjusting, the available bandwidth allotted to the gateway device, wherein an increase in the available bandwidth is based on the bandwidth priority data associated with the user equipment device.

As used in this disclosure, in some embodiments, the terms "component," "system," and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example network system 100 that provides quality of service controls and software defined networking in accordance with various aspects and embodiments of the subject disclosure. In one or more embodiments, system 100 can comprise one or more user equipment UEs 104 and 102, which can be on a network that is managed by a gateway device 106. Gateway device 106 can receive connectivity and be communicably coupled to a network 108. UE 102 and/or 104 can be a mobile device such as a cellular phone, a smartphone, a tablet computer, a wearable device, a virtual reality (VR) device, a heads-up display (HUD) device, a smart car, a machine-type communication (MTC) device, laptop, tablet, PC, gaming device, television, internet of things (IOT) device, and the like. UE 102 can also refer to any type of wireless or wired device with Wi-Fi, Bluetooth, or other communications protocol technology.

The non-limiting term gateway device or router device (e.g., gateway device 106) is used herein to refer to any type of network device that serves to regulate traffic between two or more networks. In one or more embodiments, the gateway device regulates traffic over one or more communications protocols/technologies. For example, gateway device 106 can receive traffic from network 108 via a DSL, cable, fiber optic, wireless (e.g., WiMAX, 6LoWPAN, Wi-Fi, cellular, or other wireless technology) and then transfer the traffic to UE 102 and 104 via an ethernet, Wi-Fi, Bluetooth, or other short/medium range wired or wireless connection).

In an embodiment, gateway device 106 can manage QoS for traffic to and from UE 102 and 104 and network 108. Gateway device 106 can also manage which devices on a network associated with gateway device 106 receive network connectivity based on a variety of criteria, such as time, location, user preferences, device preferences, etc. For instance, gateway device 106 can prioritize traffic (e.g., guarantee a predetermined data rate, give preference to packets, etc.) to UE 102 over UE 104 based on the time of day, location of UE 102, device type of UE 102, user account associated with UE 102 and/or UE 104, and other preferences.

In an embodiment, gateway device 106 can manage traffic by prioritizing network traffic by limiting the amount of bandwidth available to one UE versus another UE. In other embodiments, gateway device 106 can set a data rate limit on a UE, or can apportion a set data transfer amount to a UE. In an embodiment, the gateway device 106 can set different classes of services for different users, devices or types of network services (e.g., real-time communication, web browsing, etc.) or for corporate or personal users. In other embodiments, the gateway device 106 can customize (e.g., increase/decrease) bandwidth to meet individualized customer needs (e.g., based on a network service request, type of network service, etc). In other embodiments, if the total demand for bandwidth from UE 102 and UE 104 exceeds the bandwidth allotted by the network 108 to gateway device 106, gateway device 106 can send a request to increase the bandwidth allotted to the gateway device 106. In other embodiments, gateway device 106 can allow the bandwidth to increase, and network 108 can track and record the overage for billing and recording purposes. Gateway device 106 can determine that bandwidth adjustments are permitted by the terms of the service contract or based on profile information of a subscriber account associated with the gateway device 106.

In an embodiment, the gateway device 106 can increase bandwidth from the network 108 based on requests from a user interface, or based on scheduled information. For example, gateway device 106 can have access to one or more calendars associated with a subscriber identity or a user identity associated with one or more of UE 102 and/or 104, and based on calendar data, the gateway device 106 can predict that demand will be high, and request increased bandwidth for a predetermined period of time. For example, if gateway device 106 determines that a gaming party is to take place at the location serviced by gateway device 106, depending on the number of invitees, gateway device 106 can predict whether the allotted bandwidth or data rate is acceptable or insufficient and increase the data rate for the time scheduled.

It is to be appreciated that the foregoing embodiments, while described in reference to the gateway device 106 performing tasks, sending requests, managing traffic, and etc, in other embodiments these processes can be performed by the network 108. In an embodiment, control plane and user plane functions of the network 108 extend into the gateway device 106 as well, and tasks can be shared by gateway device 106 and one or more server devices associated with the network 108. It is to be appreciated that whenever reference is made to the gateway device 106 or the network 108 managing traffic, performing QoS controls, etc., either device/server is implicated and can perform similar tasks in other embodiments.

In another embodiment, either gateway device 106 or network 108 can instantiate VNFs in order to manage, handle, and/or otherwise process data associated with network services requested by UE 102 and/or 104. Gateway device 106 or network 108 can predict whether a VNF is to be instantiated based on calendar data, network services requested, locations of the UE 102 and/or 104, subscriber accounts logged into UE 102 and/or 104, etc. In an embodiment, in response to receiving a request to initiate a network service by UE 102 or 104, gateway device 106 or network 108 can determine whether an existing VNF can service the network service. If not, the gateway device 106 or the network 108 can instantiate a VNF, either at the gateway device 106 or in the network 108, in order to service the network service.

In an embodiment, gateway device 106 and/or network 108 can prioritize traffic based on profile information associated with the devices 102 and 104, or based on subscriber profile information associated with gateway device 106. For example, profile information can state that certain devices are to receive priority at certain times of day, or in certain locations. In other embodiments, the profile information can state that minimum data rates are to be maintained at predetermined times, locations, when certain users are logged in, or depending on the network service being used, application being used, or any combination of the aforementioned factors.

In an embodiment, though profile information can comprise prioritization levels based on different criteria, if the prioritizations levels conflict for different devices, the gateway device 106 or network 108 can recognize a hierarchy of prioritization levels. In one embodiment for example, prioritization levels can be organized such that device priority is highest, followed by user priority (gateway device 106 and network 108 can track user across different devices), device location priority, specific use priority (gaming, video streaming, VR/AR collaboration, etc), time of day priority, etc. In other embodiments, different priority hierarchies can be recognized by the system, and can be changed dynamically. For instance, at certain times, or locations a first hierarchy can be recognized, whereas, at another location, or another time, a different hierarchy can be recognized.

Figure 2:
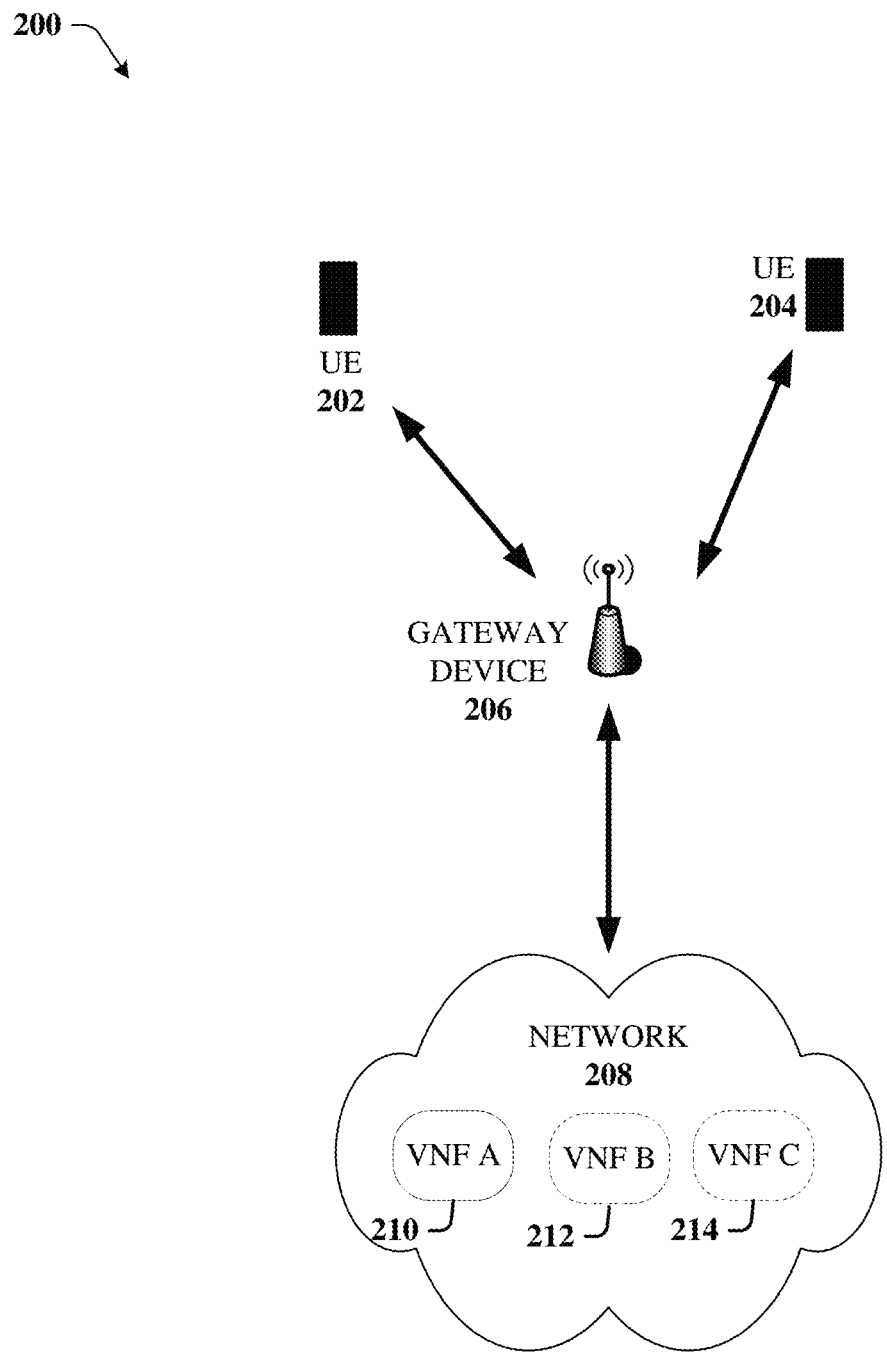
FIG. 2 illustrates an example network that provides quality of service controls and virtual network functions in accordance with various aspects and embodiments of the subject disclosure.

Turning now to FIG. 2, illustrates an example embodiment 200 of a network that provides quality of service controls and virtual network functions in accordance with various aspects and embodiments of the subject disclosure.

The network 208 can instantiate VNF machines in order to process and manage network services requested by UE 202 or UE 204. VNFs are a type of architecture that uses the technologies of information technology virtualization to virtualize entire classes of network node functions into building blocks that may connect, or chain together, to create communication services. These VNFs can be instantiated on machines in order to perform specified tasks and then deactivated when no longer needed, allowing for increased flexibility and reduced computer resources.

In an embodiment, based on demand from UE 202 and UE 204, VNF A 210 can be instantiated by network 208 in order to manage one or more network services requested by UE 202 and 204. If a different network service is requested, or there is increased demand (e.g., more devices requesting the same network service, or requesting greater bandwidth) network 208 can instantiate additional VNFs B and C 212 and 214. In an embodiment, the VNFs 210 212, and 214 can also be instantiated on gateway device 206.

In an embodiment, the VNFs 210, 212, and 214 can be instantiated in response to receiving a request for a service from UE 202 or UE 204, or can be instantiated based on predicted network service requests usage, or based on previous patterns of usage. An intelligence agent in the gateway device 206 or the network 208 can track usage over time and predict when network usage is increased based on the time of day, date, location of the devices in the network, which applications are being used, which user identities are logged in, etc.

For example, for an office network, VNFs can be instantiated to handle network services at the start of the business day, but be deactivated on holidays or weekends. Similarly, if a user invites friends for a gaming party, VNFs to handle the gaming party can be instantiated when network services associated with the game or started, or based on examining calendar data, or based on detecting user equipment devices with the gaming friends.

Figure 3:
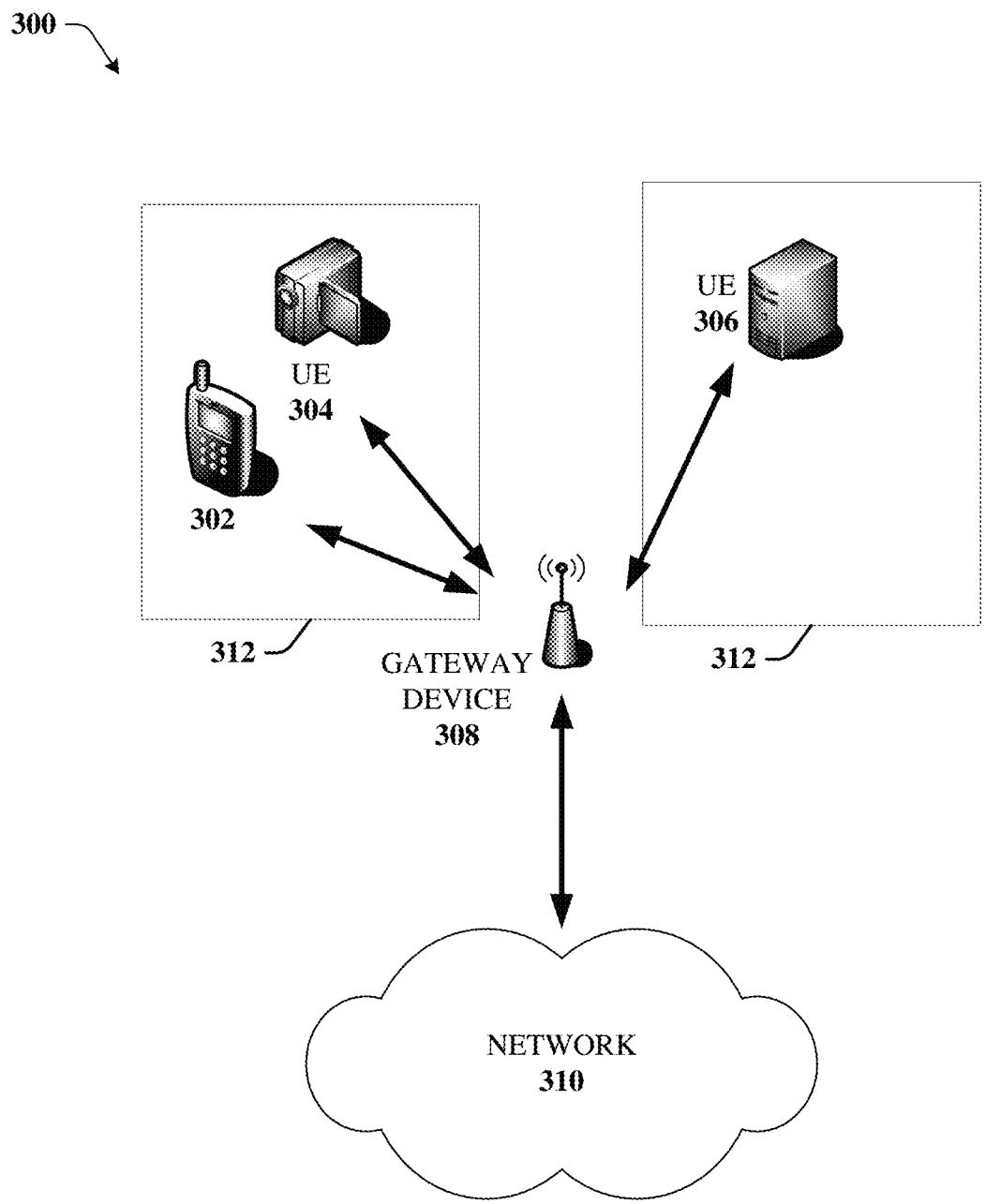
FIG. 3 illustrates an example network that can prioritize devices and network services based on location and other factors in accordance with various aspects and embodiments of the subject disclosure.

Turning now to FIG. 3, illustrated is an example embodiment 300 of a network that can prioritize devices and network services based on location and other factors in accordance with various aspects and embodiments of the subject disclosure.

The embodiment shown in FIG. 3, shows how the gateway device 308 and the network 310 can prioritize and manage traffic from device 302, 304, and 306 based on the type of device, location, time, or based on profile data associated with the device or profile data associated with a user of the device, or based on profile data associated with the gateway device 308 or based on subscriber profile data.

In an embodiment, gateway device can determine a location of a device by receiving a device reported location, performing network location, or by determining to which access point a device a device is connected. Different locations can have different priority rankings, for instance, a lobby of an office might have a lower priority to provide high speed bandwidth than an office or conference room. In an embodiment, gateway device 308 or network 310 can determine that device 306 is in room 314, which has a higher priority ranking than room 312, and thus gateway device can prioritize traffic and network services from device 306 as compared to devices 302 and 304.

In other embodiments, gateway device 308 and/or network 310 can discriminate on the basis of device type. Thus, device 302 may receive a higher priority ranking than device 304 and 306. In other embodiments, gateway device 308 and/or network 310 can determine which user is logged in, and provide QoS controls based on the user. In other embodiments, gateway device 308 and/or network 310 can discriminate on the basis of the application being used, or the type of network service (e.g., video conference>voice communications>web browsing>email), or based on the time of day.

Gateway device 308 and network 310 can determine profile data associated with the user accounts or subscriber identity. For instance, different user accounts can have profile information specifying minimum/maximum bandwidth rates, and other QoS variables. In an embodiment, the profiles can be customized by the users and/or subscribers by input received from the users via an interface. In an embodiment, the gateway device 308 or network 310 can allow the customer to manage the QoS within their account, controlling prioritization as they prefer. The customer will be able to prioritize off multiple categories, including based on location in house hold which products are prioritized, services, devices, and time of day) this will allow the customer to have their network customized to work for their specific needs.

In another embodiment, profile data from one or more UEs may come from other intelligence agents on the network. For example, UE 404 may be a visiting customer or neighbor that resides on a network with a different "home" gateway device 406. The intelligence agent 412 that corresponds to that secondary gateway device 406 may send profile data for its UE 404 to an intelligence agent 410 in the network 408 so that it may be propagated (by identification) to other intelligence agents 412 outside of the core network. In a similar embodiment, the intelligence agent 412 at the first gateway device 406 may issue a request for information (or query) to the network 408 for additional profile data that may reside in other network-based agents 410 or intelligence agents 412 associated with other gateway devices 406. In either of these embodiments, the intelligence agent 410 in the network 408 may respond with partial or aggregate profile information based on other UEs if a profile specifically associated to the UE 404 is unavailable.

Figure 4:
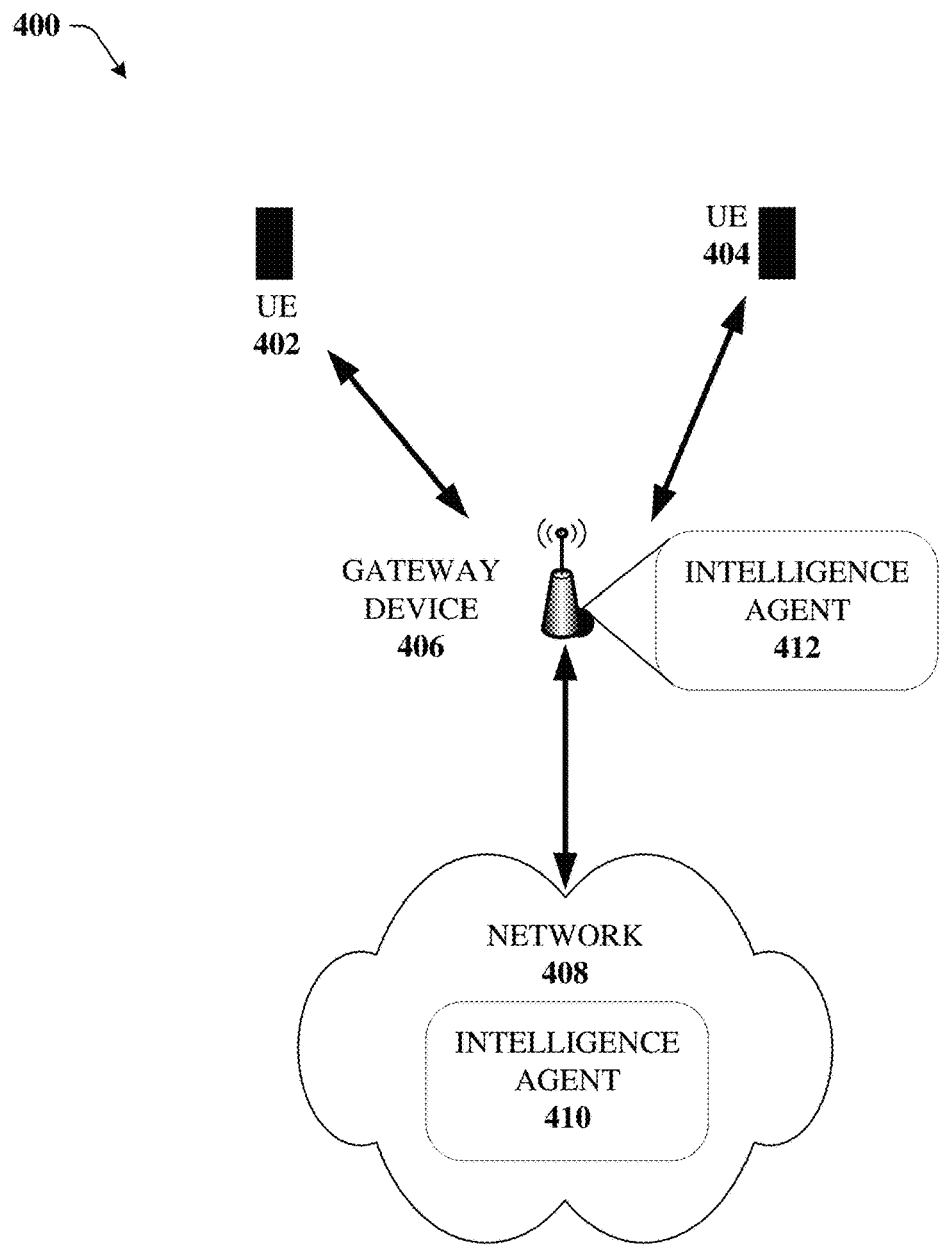
FIG. 4 illustrates an example network that has an intelligence agent in both a gateway device and a cloud server in accordance with various aspects and embodiments of the subject disclosure.

Turning now to FIG. 4, illustrated is an example embodiment 400 of a network that has an intelligence agent in both a gateway device and a cloud server in accordance with various aspects and embodiments of the subject disclosure.

In the embodiment shown in FIG. 4, either the gateway device 406 or the network 408 can comprise the intelligence agent 412 or 410 respectively that can make predictions about bandwidth usage, network services requested, etc. in order for the gateway device 406 and/or network 408 to manage traffic from UE 402 and 404.

In an embodiment, the intelligence agent 410 and 412 can monitor usage of the network over time and track usage by devices 402 and 404 in order to make predictions about what network services will be requested, the amount of bandwidth required, and etc, in order to assist gateway device 406 and network 408 instantiate VNFs, set the correct bandwidth rates, and otherwise manage QoS for the devices 402 and 404.

In an embodiment, the intelligence agent 410 and 412 can analyze past usage in order to determine and predict future usage. For instance, intelligence agent 410 and/or 412 can determine that on certain days, bandwidth usage increases from a first rate to a second rate, and thus intelligence agent 410 and/or 412 can initiate instantiation of VNFs to handle the increased bandwidth or network services. In other embodiments, the intelligence agent 410 and/or 412 can track the location of devices 402 and 404, the applications being executed on the devices, the users logged into the devices, and predict future usage.

In an embodiment, the intelligence agent 410 and/or 412 can also use sensor data, (audio from microphones, video from cameras, etc) in order to make predictions about bandwidth usage. Intelligence agent 410 and 412 can also interact with IoT devices connected to the network and gather contextual data and other relevant data. For example, intelligence agent 410 and/or 412 can determine that a user has arrived home based on a door scanner, or a garage door opener being activated, and can instantiate one or more VNFs in order to manage the traffic.

Figure 5:
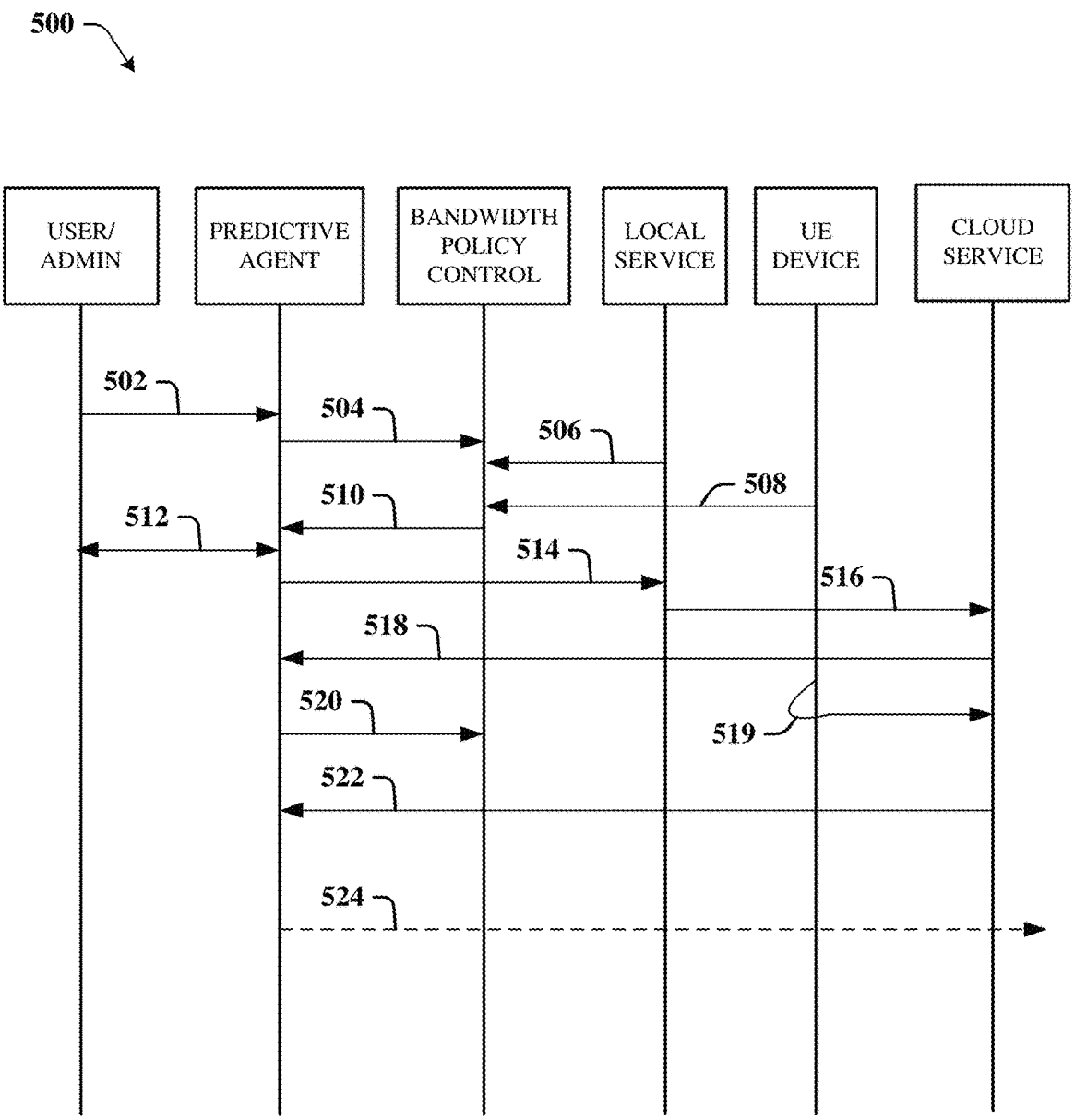
FIG. 5 illustrates a flowchart for a providing bandwidth control in accordance with various aspects and embodiments of the subject disclosure.

Turning now to FIG. 5, illustrated is a flowchart 500 for a providing bandwidth control in accordance with various aspects and embodiments of the subject disclosure.

In an embodiment described herein, the flowchart can correspond to a particular use case involving providing bandwidth control and network services for a gaming party, but similar flowcharts can correspond to other exemplary use cases.

In an embodiment, at 502, the user or admin can input via an interface to the predictive agent (e.g., intelligence agent 410 or 412) rough information for the special event including rough estimates of user count, bandwidth per user, time of event, game being played, maximum overall bandwidth, preferred services (video conferencing, audio conference, etc), and other information.

At 504, the predictive agent can determine an estimated bandwidth required based on the information provided at 502. The bandwidth can be automatically determined based on the known devices and services being requested. At 506 and 508, the local service can change the bandwidth estimate based on feedback information from the user and device location (main room, office, etc). At 510, the estimate can further be adjusted as the predicted agent interacts with controllers on the UE device to revise the prediction. At 512, the predictive agent can check with the user/admin to guarantee that the full bandwidth is available for every participant in the gaming party. Anomalies can be brought to user attention or automatically denied/approved based on policy assigned.

At 514, the system, based on predictions, can instantiate cloud based cloud hosted VNFs to replicate on-site service, and increase out of home bandwidth connectivity based on the demand increasing. At 516, system can instantiate VNFs while hosting a gaming video/server, and at 518, the cloud can push out profiles or prediction-enabling data to one or more predictive agents throughout a network for a wider audience usage and modulate policy. At 519, the UE device is also capable of updating profiles in the cloud.

At 520, the predictive agent can use automatic/learned profiles to begin to reduce bandwidth towards the end of the event when observing decreased device count, by average utilization observations, or combined with time information within event (e.g. lunch break or intermission would not decrease but near end of event may). At 522, the predictive agent can dynamically track the cloud based services usage in order to make dynamic changes. At 524, the predictive agent can record historical observations for the party for next the event at either the same house or a different house. The learned predictions and profiles can be shared amongst different users, and different gateway devices.

Figure 6:
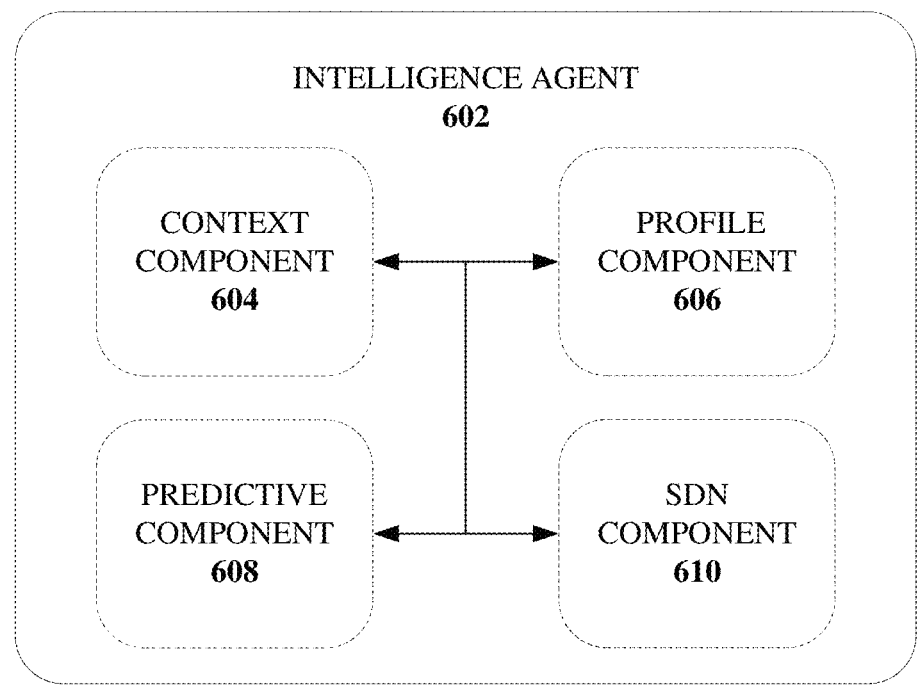
FIG. 6 illustrates an example block diagram of an intelligence agent in accordance with various aspects and embodiments of the subject disclosure.

Turning now to FIG. 6, illustrated is an example block diagram 600 of an intelligence agent 602 in accordance with various aspects and embodiments of the subject disclosure. Intelligence agent 602 can correspond to the intelligence agent 410 or 412 in FIG. 4, and also perform the functions and processes attributed to the gateway devices and networks in FIGS. 1-3.

The intelligence agent 602 can include a context component 604 that can gather information about a network and devices connected to a network. The information can include the number of devices connected to a network, the types of devices, the user identities associated with the devices, the applications being used by the devices, types of network services requested, bandwidth being used, etc. The context component 604 can also locate which rooms the devices are in based on location information received from the devices, performing network location determination, determining which access point the devices are connected to, and also using sensor data (motion, audio, visual, etc) in order to gather information about what types of network services may be requested.

The context component 604 can also sync with calendar data or email data from user accounts associated with the devices to determine if there are any events occurring that might need a different type of network service, increased bandwidth, or other actions.

A profile component 606 can be provided to generate information relating to priorities and priority hierarchies for devices connected to a network the intelligence agent 602 manages. For example, service patterns and bandwidth profiles can be created that both exist singularly and in combined bundles across device type, service type (video, gaming, etc.), user location in the premises, a specific time of day, etc. For example, profile information can state that certain devices are to receive priority at certain times of day, or in certain locations. In other embodiments, the profile information can state that minimum data rates are to be maintained at predetermined times, locations, when certain users are logged in, or depending on the network service being used, application being used, or any combination of the aforementioned factors.

In an embodiment, though profile information collected by the profile component 606 can comprise prioritization levels based on different criteria, if the prioritizations levels conflict for different devices, the profile component 606 can recognize a hierarchy of prioritization levels. In one embodiment for example, prioritization levels can be organized such that device priority is highest, followed by user priority (profile component 606 can track user across different devices), device location priority, specific use priority (gaming, video streaming, VR/AR collaboration, etc), time of day priority, etc. In other embodiments, different priority hierarchies can be recognized by the system, and can be changed dynamically. For instance, at certain times, or locations a first hierarchy can be recognized, whereas, at another location, or another time, a different hierarchy can be recognized.

The intelligence agent 602 can also include a predictive component 608 that makes predictions about the bandwidth that will be used, by which devices, at which times, and etc, based on the information collected by the context component 604 and the profile component 606.

The SDN component 610 can manage the network and provide QoS controls and management based on the predictions from the predictive component 608. The SDN component 610 can also instantiate VNFs proactively to manage traffic from the network. For example, for an office network, VNFs can be instantiated to handle network services at the start of the business day, but be deactivated on holidays or weekends. Similarly, if a user invites friends for a gaming party, VNFs to handle the gaming party can be instantiated when network services associated with the game or started, or based on examining calendar data, or based on detecting user equipment devices with the gaming friends. The VNFs can be instantiated on either the gateway device or in a cloud server.

Figure 7:
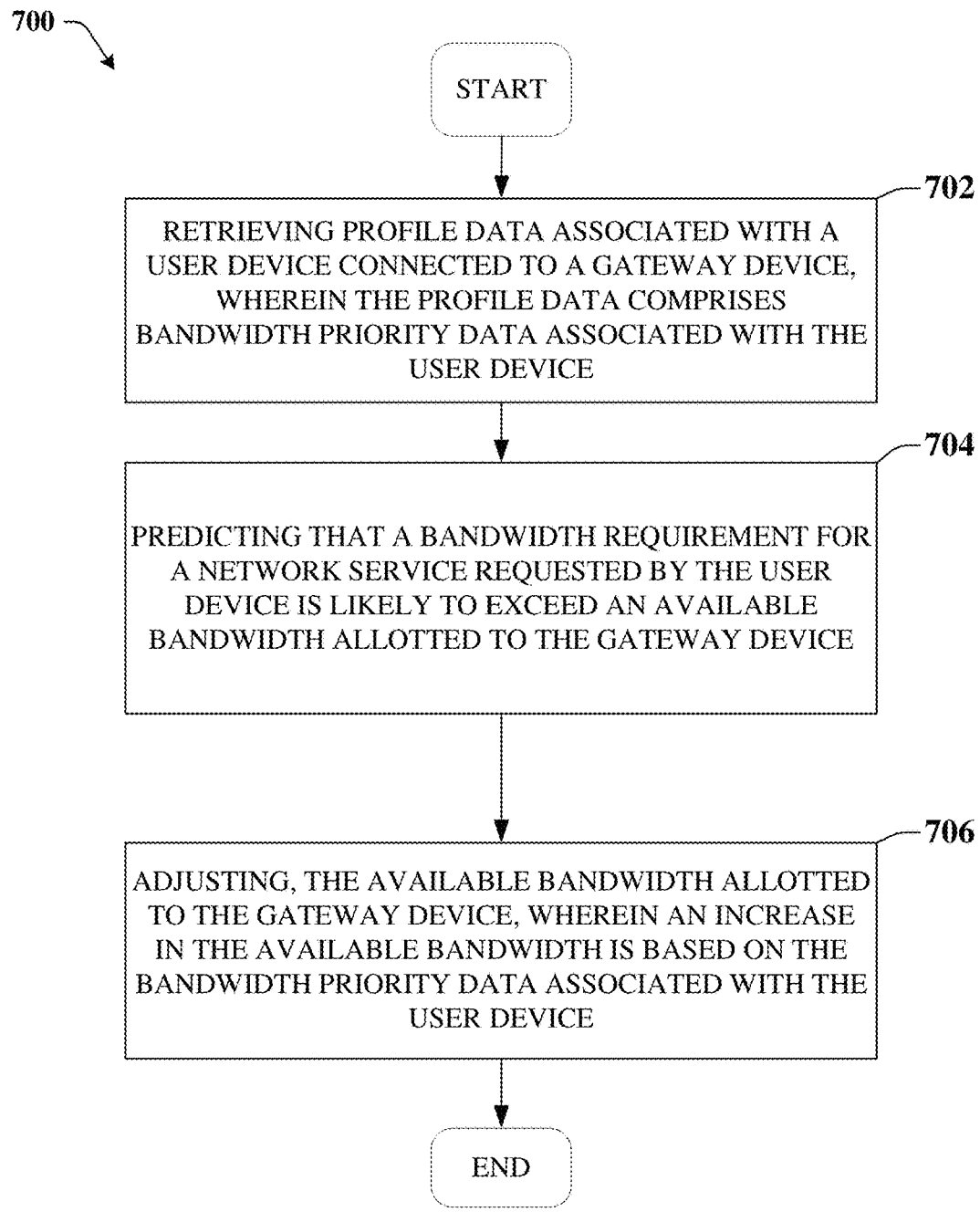
FIG. 7 illustrates an example method for providing software defined networking in accordance with various aspects and embodiments of the subject disclosure.
Figure 8:
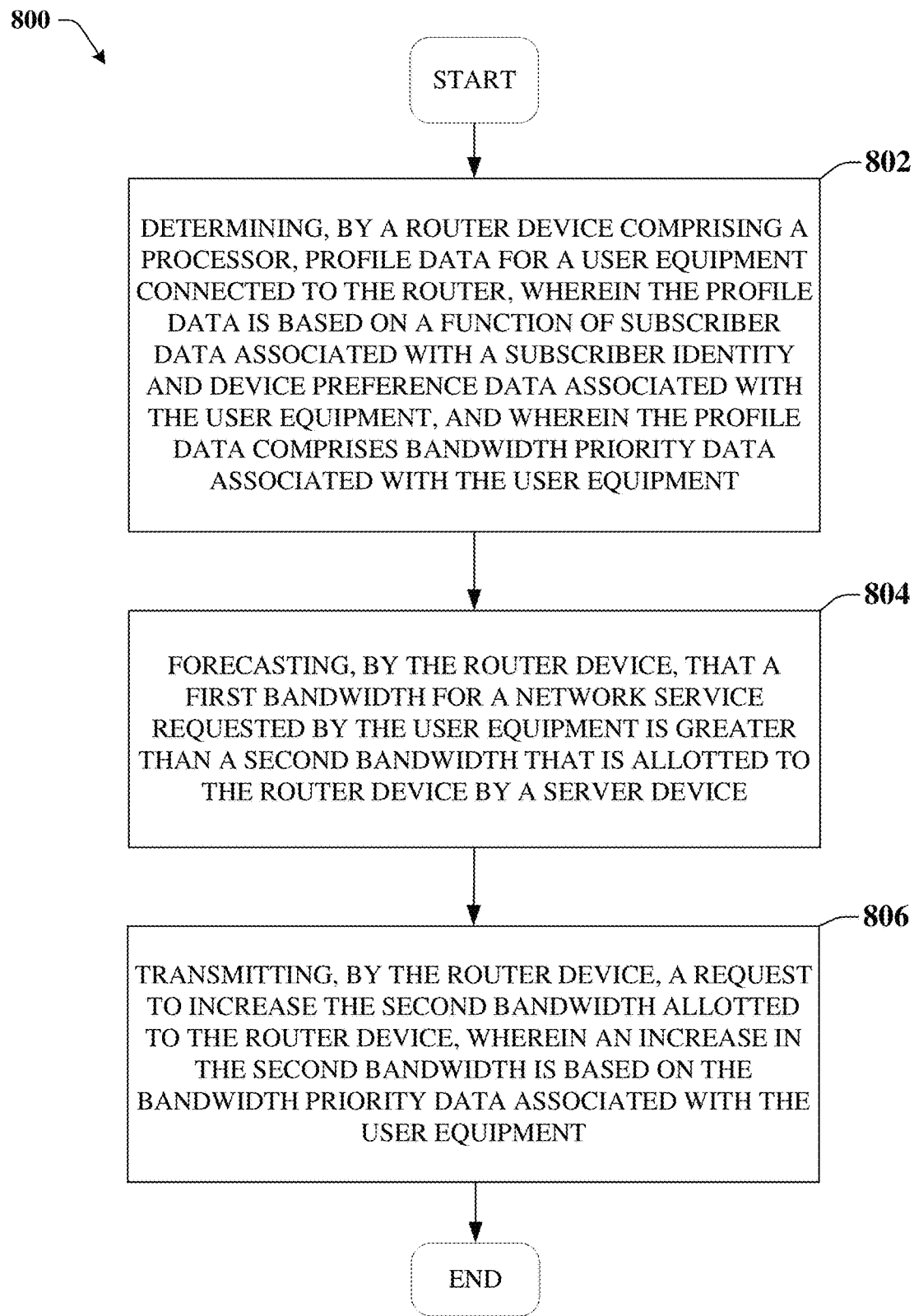
FIG. 8 illustrates an example method for providing software defined networking in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for providing software defined networking in accordance with various aspects and embodiments of the subject disclosure.

Method 700 can begin at 702 where the method includes retrieving profile data associated with a user device connected to a gateway device, wherein the profile data comprises bandwidth priority data associated with the user device.

At 704, the method includes predicting that a bandwidth requirement for a network service requested by the user device is likely to exceed an available bandwidth allotted to the gateway device.

At 706, the method includes adjusting, the available bandwidth allotted to the gateway device, wherein an increase in the available bandwidth is based on the bandwidth priority data associated with the user device.

FIG. 8 illustrates an example method 800 for providing software defined networking in accordance with various aspects and embodiments of the subject disclosure.

Method 800 can begin at 802 wherein the method includes determining, by a router device comprising a processor, profile data for a user equipment connected to the router, wherein the profile data is based on a function of subscriber data associated with a subscriber identity and device preference data associated with the user equipment, and wherein the profile data comprises bandwidth priority data associated with the user equipment.

At 804, the method can include forecasting, by the router device, that a first bandwidth for a network service requested by the user equipment is greater than a second bandwidth that is allotted to the router device by a server device.

At 806, the method can include transmitting, by the router device, a request to increase the second bandwidth allotted to the router device, wherein an increase in the second bandwidth is based on the bandwidth priority data associated with the user equipment.

Figure 9:
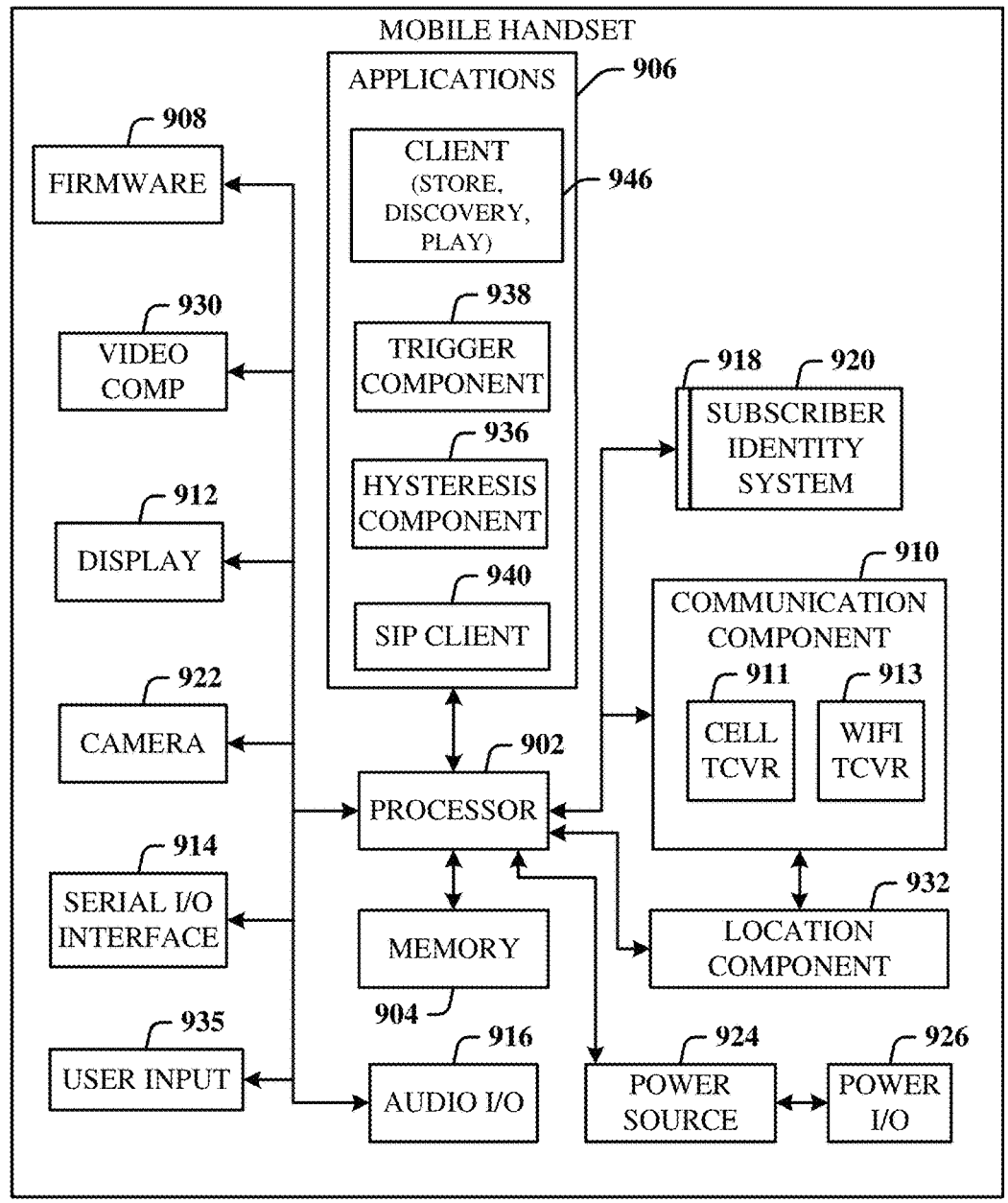
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
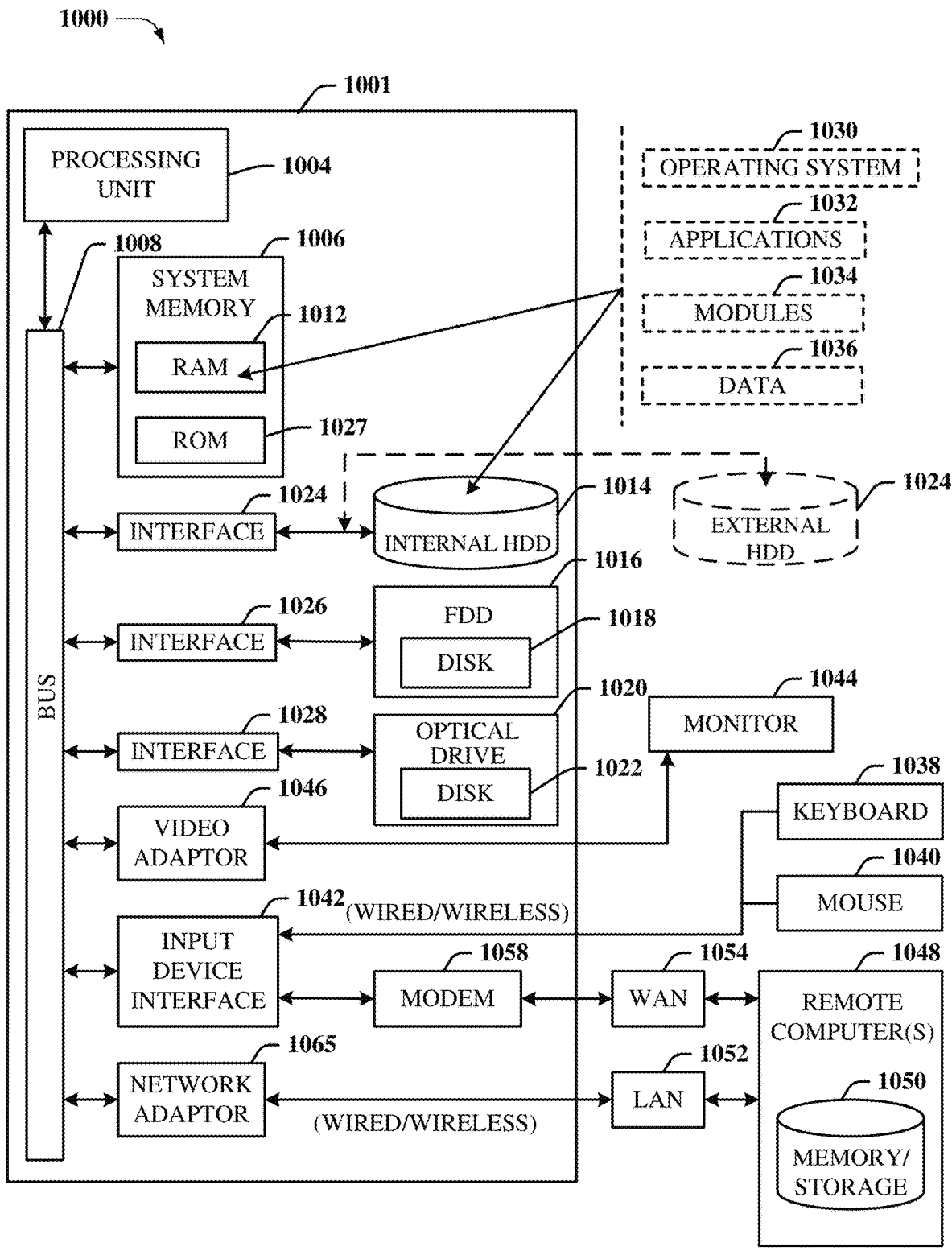
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprisewide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A server, comprising:
a processor; and
a memory that stores executable instructions that, when executed by the processor, facilitate performance of operations, comprising:
retrieving profile data associated with a user device connected to a gateway device, wherein the profile data comprises bandwidth priority data associated with the user device;
predicting that a bandwidth requirement for a network service that is forecasted to be requested by the user device is likely to exceed an available bandwidth allotted to the gateway device, wherein the predicting comprises:
accessing a user email account associated with the user device,
determining, based on an analysis of email data in the user email account, a future user event and a quantity of invitees to the future user event, where the future user event is associated with the network service that is forecasted to be requested, and
estimating the bandwidth requirement based at least on the quantity of invitees to the future user event; and
adjusting, the available bandwidth allotted to the gateway device, wherein an increase in the available bandwidth is based on the bandwidth priority data associated with the user device.

2. The server of claim 1, wherein the operations further comprise:
instantiating a virtual network function to manage the network service requested by the user device.

3. The server of claim 2, wherein the virtual network function is selected from a group of virtual network functions based on the profile data associated with the user device.

4. The server of claim 1, wherein the profile data comprises subscriber identity information and device identity information.

5. The server of claim 1, wherein the adjusting the available bandwidth allotted to the gateway device is in response to determining that subscriber identity data associated with the gateway device permits adjusting bandwidth.

6. The server of claim 1, wherein the predicting further comprises:
analyzing a usage history of the user device over a period of time to generate a usage pattern, wherein a prediction about the bandwidth requirement for the network service is based on the usage pattern.

7. The server of claim 6, wherein the usage pattern comprises information associated with a time of network service usage and a location of the user device at the time of network service usage.

8. The server of claim 1, wherein the operations further comprise:
partitioning bandwidth between a group of user devices based on respective bandwidth priorities associated with the group of user devices.

9. The server of claim 1, wherein the operations further comprise:
partitioning bandwidth between a group of user devices based on respective types of network services requested by the group of user devices and preference data associated with subscriber identity information associated with the gateway device.

10. The server of claim 1, wherein the adjusting the available bandwidth is facilitated by using software defined networking and network function virtualization protocols.

11. A machine-readable storage medium, comprising executable instructions that, when executed by a processor of a device, facilitate performance of operations, comprising:
determining profile data associated with a user equipment device connected to a gateway device, wherein the profile data comprises bandwidth priority data associated with the user equipment device;
predicting that a bandwidth requirement for a network service that is forecasted to be requested by the user equipment device is likely to exceed an available bandwidth allotted to the gateway device, wherein the predicting comprises:
accessing a user email account of the user device,
determining, based on an analysis of email data in the user email account, a future user event and a quantity of invitees to the future user event, where the future user event is associated with the network service that is forecasted to be requested, and
estimating the bandwidth requirement based at least on the quantity of invitees to the future user event; and
adjusting, the available bandwidth allotted to the gateway device, wherein an increase in the available bandwidth is based on the bandwidth priority data associated with the user equipment device.

12. The machine-readable storage medium of claim 11, wherein the operations further comprise:
instantiating a virtual network function to manage the network service requested by the user equipment device.

13. The machine-readable storage medium of claim 11, wherein the operations further comprise:
analyzing a usage history of the user equipment device over a period of time to generate a usage pattern, wherein a prediction about the bandwidth requirement for the network service is based on the usage pattern.

14. A method, comprising:

retrieving, by a server comprising a processor, profile data associated with a user device connected to a gateway device, wherein the profile data comprises bandwidth priority data associated with the user device;

predicting, by the server, that a bandwidth requirement for a network service that is forecasted to be requested by the user device is likely to exceed an available bandwidth allotted to the gateway device, wherein the predicting comprises:

accessing a user email account associated with the user device, determining, based on an analysis of email data in the user email account, a future user event and a quantity of user participants invited to the future user event, wherein the future user event is associated with the network service that is forecasted to be requested, and estimating the bandwidth requirement based at least on the quantity of user participants invited to the future user event; and adjusting, by the server, the available bandwidth allotted to the gateway device, wherein an increase in the available bandwidth is based on the bandwidth priority data associated with the user device.

15. The method of claim 14, further comprising:

instantiating, by the server, a virtual network function to manage the network service requested by the user device.

16. The method of claim 15, wherein the virtual network function is selected from a group of virtual network functions based on the profile data associated with the user device.

17. The method of claim 14, wherein the profile data comprises subscriber identity information and device identity information.

18. The method of claim 14, wherein the adjusting the available bandwidth allotted to the gateway device is in response to determining that subscriber identity data associated with the gateway device permits adjusting bandwidth.

19. The method of claim 14, wherein the predicting further comprises:

analyzing a usage history of the user device over a period of time to generate a usage pattern, wherein a prediction about the bandwidth requirement for the network service is based on the usage pattern.

20. The method of claim 19, wherein the usage pattern comprises information associated with a time of network service usage and a location of the user device at the time of network service usage.

\* \* \* \* \*